United States Patent [19]

Galarowic

[11] 4,331,228
[45] May 25, 1982

[54] ROLLER CONVEYOR SYSTEM

[75] Inventor: Lawrence A. Galarowic, Detroit, Mich.

[73] Assignee: Visi-Trol Engineering Company, Detroit, Mich.

[21] Appl. No.: 146,515

[22] Filed: May 5, 1980

[51] Int. Cl.$^3$ .............................................. B65G 43/00
[52] U.S. Cl. .................................... 198/341; 198/345; 198/781
[58] Field of Search ............... 198/341, 345, 461, 579, 198/608, 780, 781, 789–791, 339

[56] References Cited

U.S. PATENT DOCUMENTS

| 1,831,015 | 11/1931 | Le Mare | 198/784 |
| 3,527,087 | 9/1970 | Converse et al. | 198/345 |
| 4,193,493 | 3/1980 | Ekstrand | 198/781 |

FOREIGN PATENT DOCUMENTS 2416703  10/1975  Fed. Rep. of Germany ...... 198/345

Primary Examiner—Joseph E. Valenza
Attorney, Agent, or Firm—Gifford, VanOphem, Sheridan & Sprinkle

[57] ABSTRACT

A conveyor system is provided and comprises an elongated frame having a plurality of rollers mounted to the frame in a spaced and parallel relationship so that the rollers define an elongated conveyor track along which a series of workpieces are transported. A plurality of work stations are defined at predetermined longitudinally spaced positions along the track while work stops associated with the frame selectively engage and hold the workpieces at the individual work stations. The rollers between the work stations are continuously rotatably driven at a constant speed while, conversely, a friction drive arrangement is used to rotatably drive the rollers at the work station. The friction drive permits the work station rollers to remain stationary when a workpiece is held at the work station.

6 Claims, 3 Drawing Figures

ROLLER CONVEYOR SYSTEM

BACKGROUND OF THE INVENTION

I. Field of the Invention

The present invention relates generally to conveyor systems and, more particularly, to a roller conveyor system.

II. Description of the Prior Art

There are a number of previously known roller conveyor systems having an elongated frame with a plurality of spaced and parallel rollers rotatably secured to the frame and defining an elongated conveyor track. The rollers typically are rotatably driven in the same direction of rotation and thus propel articles or workpieces positioned upon the track along the track in a predetermined direction.

In one type of previously known roller conveyor system, the workpieces positioned upon the conveyor track are sequentially stopped at work stations at predetermined longitudinally spaced positions along the track. A work stop means is associated with each work station to temporarily hold the workpiece at the work station. While the workpiece is held at the work station a machine, inspection or other type of operation can be performed on the workpiece. When the operation on the workpiece is completed, the work stop means releases the workpiece so that it can proceed to the next work station for the next machine, inspection or other operation. Simultaneously, of course, the work station prepares to receive another workpiece from the work station immediately upstream from it and this process is continuously repeated.

In the previously known roller conveyors of this latter type, the rollers are conventionally rotatably mounted to a drive shaft which in turn is rotatably mounted to the conveyor frame. The drive shaft for each roller along the conveyor is continuously rotatably driven by a conventional motor means but only a frictional drive connection is provided between each drive shaft and its associated roller. Each roller is normally rotatably driven by its associated drive shaft. Due to the friction drive between the roller and its drive shaft, however, the roller can remain stationary despite the continued rotation of the drive shaft. This arrangement is necessary to enable the workpieces to be temporarily halted at the various work stations along the conveyor track during the machining, inspection or other type of operation. Once the operation has been completed, the work stops are moved away from the workpiece at the work station and the rollers at the work station again begin to rotate due to the frictional drive connection between each roller and its drive shaft.

This previously known conveyor system, however, is disadvantageous in that, once stopped, the workpiece accelerates relatively slowly towards the next work station after the work stops have been removed. The slow acceleration of the workpieces from one work station and to the next work station is due to the frictional drive arrangement between each drive shaft and its roller.

SUMMARY OF THE PRESENT INVENTION

The present invention provides an improved roller conveyor system in which the workpieces can be stopped at longitudinally spaced work stations along the conveyor track and in which the workpieces are rapidly transported from one work station and to the next.

In brief, the conveyor system of the present invention comprises an elongated frame and a plurality of rollers rotatably mounted to the frame in a spaced and parallel relationship. The rollers define an elongated conveyor track along which a series of workpieces are transported. In addition, a plurality of work stations are formed at predetermined longitudinally spaced positions along the track and work stop means are secured to the frame at each work station for temporarily holding a workpiece at the work station.

A motor is mounted to the frame and is drivingly connected with each of the conveyor rollers in between the work stations. Thus, upon actuation of the motor the conveyor rollers between the work stations are continuously rotatably driven at a constant speed.

Unlike the rollers positioned in between adjacent work stations, each conveyor roller at the work stations comprises an outer tubular member which is rotatably mounted to a drive shaft extending axially throughout it. The drive shaft in turn is rotatably mounted to the frame by bearings and one end of the drive shaft is drivingly connected to the motor so that the drive shafts rotate in unison with the rollers positioned in between adjacent work stations.

A frictional drive is provided between each drive shaft and the tubular member at the work stations so that the drive shaft normally rotatably drives the tubular member. When the workpiece is held at the work station, however, the friction drive between the drive shaft and the tubular member will slip so that the tubular member remains stationary despite the continued rotation of the drive shaft as long as the workpiece is held by the work stop means at the work station. When the work stop means is disengaged from the workpiece, the friction drive between the drive shaft and its tubular member again accelerates and propels the workpiece down the conveyor track.

The conveyor system of the present invention is advantageous in that all of the conveyor rollers between the work stations are continuously driven at a constant rate of speed. Thus, even though a workpiece is initially slowly accelerated after release from the work stop, as soon as the workpiece contacts one of the constantly driven rollers between the work stations, the workpiece will almost immediately attain its maximum speed on the conveyor track until it reaches the next work station. Thus, the conveyor system according to the present invention is capable of rapidly transporting the workpieces along the conveyor track while still permitting the workpieces to be stopped at the work stations for a machine, inspection or other type of operation.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
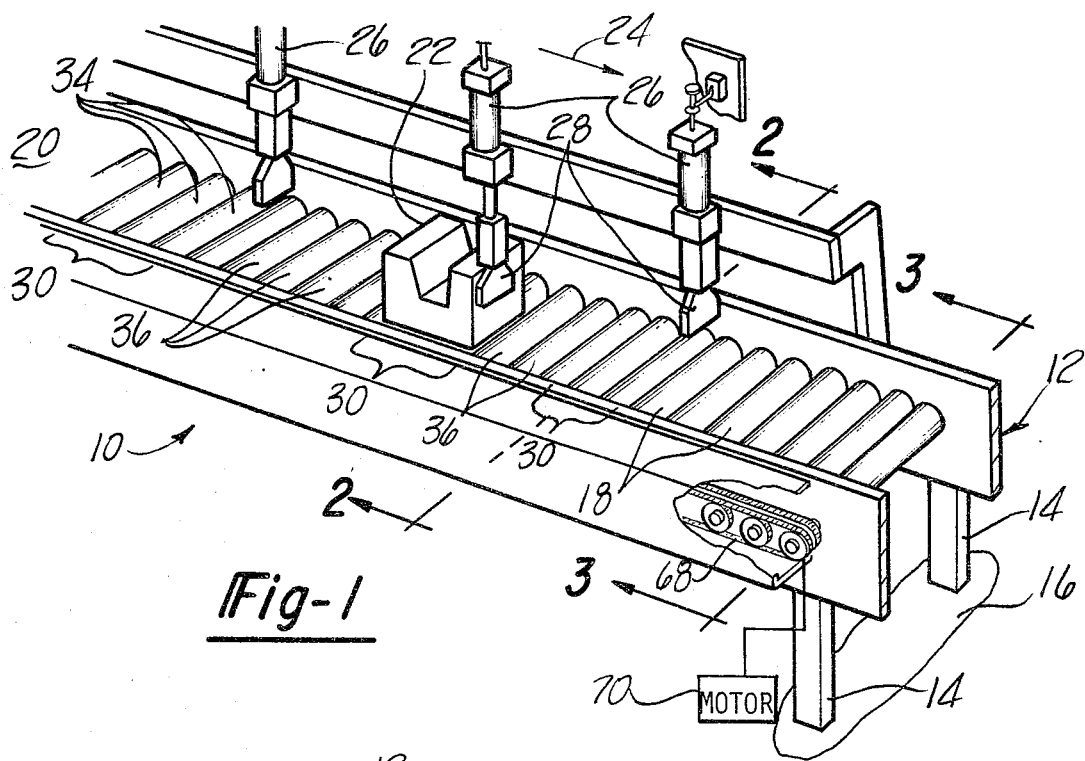
FIG. 1 is a fragmentary perspective view of a preferred embodiment of the conveyor system of the present invention.

With reference first to FIG. 1, the conveyor system 10 according to the present invention is thereshown and comprises an elongated frame 12. The frame 12 is supported in an elevated position by support legs 14 above a ground support surface 16.

A plurality of rollers 18 are rotatably secured to the frame 12 in a spaced and parallel relationship with respect to each other so that the rollers 18 define an elongated conveyor track 20 along which a series of workpieces 22 (only one of which is shown) are transported in the direction of arrow 24. The actual rotatable mounting of the rollers 18 to the frame 12 will be subsequently described in greater detail.

A plurality of work stop means 26 are secured to the conveyor frame 12 at predetermined longitudinally spaced positions along the conveyor track 20. Each work stop means 26 includes a work stop member 28 which can be selectively positioned over the conveyor track 20 and into the path of the workpiece 22 to prevent the further travel of the workpiece 22 along the conveyor track 20. Thus, a work station 30 is associated with each of the work stop means 26 immediately upstream from the work stop means 26 and, when the workpiece 22 is held by the work stop means 26 at the work station 30, a machine, inspection or other operation can be performed on the workpiece 22.

When the workpiece 22 is positioned at one of the work stations 30 and held stationary by the work stop means 26, the workpiece 22 rests upon a number of work station rollers 34 which form a portion of the conveyor rollers 18. As shown in FIG. 1, the three conveyor rollers 18 immediately upstream from each work stop means 26 are work station rollers 34 although this number will vary with the size of the workpiece 22. Conversely, a number of intermediate rollers 36 are positioned immediately downstream from each work station 30 and extend to the rollers 34 at the next work station 30. The work station rollers 34 and intermediate rollers 36 together form all of the conveyor rollers 18.

Figure 3:
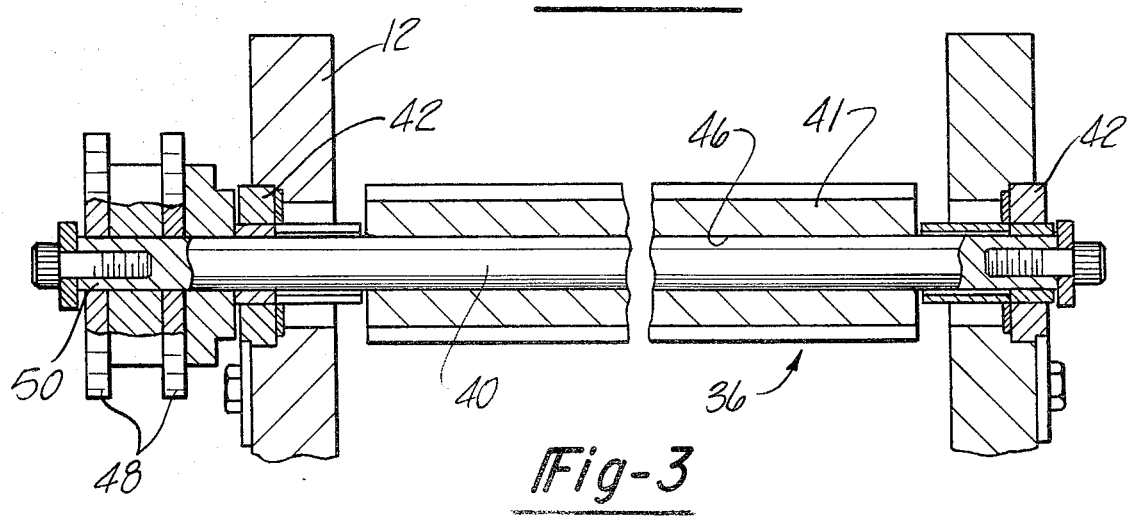
FIG. 3 is a fragmentary perspective view taken substantially along line 3—3 in FIG. 1.

With reference now to FIG. 3, the intermediate roller 36 is thereshown in greater detail and comprises a shaft 40 which extends coaxially through a tubular cylindrical member 41 and is rotatably mounted to the frame 12 by bearings 42 so that the tubular member 41 is positioned in between the bearing 42. Thus tubular member 41, moreover, is secured to the shaft 40 so that the tubular member 41 rotates in unison with the shaft 40. Although any conventional means may be used to secure the tubular member 41 to the shaft 40, preferably the shaft 40 has a polygonal cross-sectional shape and is positioned through a like shaped coaxial bore 46 in the roller 41. In addition, a double sprocket 48 is secured to one end 50 of the shaft 40.

Figure 2:
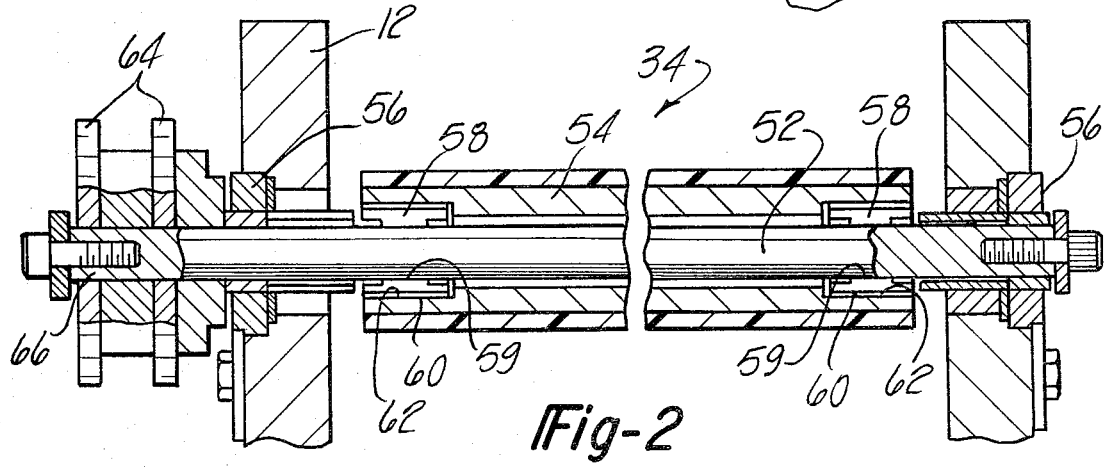
FIG. 2 is a fragmentary sectional view taken substantially along line 2—2 in FIG. 1.

Referring now to FIG. 2, the work station roller 34 is thereshown in greater detail and comprises a drive shaft 52 which extends coaxially through a tubular cylindrical member 54 and is rotatably secured to the conveyor frame 12 by bearings 56 so that the tubular member 54 is positioned in between the bearings 56. A pair of friction bushings 58 having an outer cylindrically circular surface 60 are secured to the shaft 52 at spaced points and these bushings 58 are received within like shaped recesses 62 formed in each end of the tubular member 54. Although any means can be used to secure the bushings 58 to the shaft 52, preferably the shaft 52 is polygonal in cross section and is positioned through a like shaped bore 59 in each bushing 58. In addition, a double chain sprocket 64 is secured to one end 66 of the drive shaft 52.

Still referring to FIG. 2, unlike the immediate rollers 36, the tubular member 54 for the work station roller 34 can rotate with respect to the drive shaft 52. Instead, the outer periphery 60 of the bushing 58 frictionally cooperates with the tubular member recess 62 so that a frictional drive is formed between the drive shaft 52 and the tubular member 54. Thus, rotation of the drive shaft 52 normally rotatably drives its associated tubular member 54, but the tubular member 54 can be stopped despite the continued rotation of its drive shaft 52. In this event, the bushings 58 merely rotate within the tubular member recesses 62.

Referring now to FIG. 1, the sprockets 64 on the work station drive shaft 52 and the sprockets 48 on the intermediate roller drive shaft 40 are drivingly connected together by endless chains 68 or by any other conventional means. The chains 68, in turn, are rotatably driven by a conventional motor means 70 (only diagrammatically illustrated) so that, upon actuation of the motor 70, all of the intermediate rollers 36, including their outer tubular member 41, are continuously rotatably driven at a constant rate of speed. Simultaneously, the drive shafts 52 for the work station rollers are likewise continuously rotatably driven at a constant rate of speed and the rotation of each drive shaft 52 is imparted to its associated tubular member 54 via the friction bushings 58.

With reference now to FIG. 1, in operation the workpieces 22 are sequentially conveyed along the conveyor track from one work station 30 to the next downstream work station 30. Assuming that one workpiece 22 is held at a work station 30 by the work stop means 26, the intermediate rollers 36 are continuously rotatably driven by the motor means 70 and simultaneously the drive shaft 52 for the work station rollers 34 are continuously rotatably driven. However, since the workpiece 22 is held at the work station, the tubular members 54 for the work station rollers 34 are held stationary due to the weight of the workpiece on the roller. At this time, any desired machining, inspection or other type of operation can be performed on the workpieces 22 at the work stations 30.

Upon completion of the machining, inspection or other type of operation, the work stop members 28 disengage from the workpieces 22 thus releasing them to move to the next downstream work station 30. At this time, the frictional drive between the drive shaft 52 and tubular member 54 of the work station rollers will begin to move the workpieces 22 toward the next downstream work station since the workpieces 22 are no longer held at the work stations. Due to the inertia of the workpieces 22, however, the initial speed of the workpieces 22 is relatively low as the workpieces begin to move away from the work stations 30. However, as soon as the downstream edge of the workpiece 22 contacts the first intermediate roller 36 downstream from the work station 30, the intermediate roller will engage and rapidly accelerate the workpiece 22 toward the next work station since the intermediate roller 36 is continuously rotatably driven. In this fashion, the workpieces 22 are rapidly accelerated to their maximum speed on the conveyor track 20 in the desired fashion. At the next downstream work station 30 the workpieces are again stopped for the next sequential machining, inspection or other type of operation and the above described process is again repeated.

From the foregoing it can be seen that the conveyor system of the present invention provides a novel roller conveyor which enables the workpieces 22 to be rapidly transported from one work station and to the next work station and in which the workpieces 22 can be stopped temporarily at the work stations 30 in the desired fashion.

Having described my invention, however, many modifications thereto will become apparent to those skilled in the art to which it pertains without deviation from the spirit of the invention as defined by the scope of the appended claims.

I claim:

1. A conveyor system comprising:
   an elongated frame;
   a plurality of rollers rotatably mounted to said frame in a spaced and parallel relationship, said rollers defining an elongated conveyor track along which a series of workpieces are transported;
   said track having a plurality of work stations at predetermined longitudinally spaced positions along said track;
   means for continuously rotatably driving said rollers between said work stations;
   each roller at each work station further comprising a drive member and a tubular driven member;
   means for continuously rotatably driving said tubular drive members at said work stations; and
   means for drivingly connecting each drive member to its driven member so that each driven member rotates in unison with its associated drive member while permitting said driven member to remain stationary when a workpiece is held at the work station despite continued rotation of its associated drive member.

2. The invention as defined in claim 1 wherein said drive member comprises a shaft extending axially through each driven member, said shaft being rotatably mounted to the frame, and wherein said drive connecting means further comprises a bushing secured to said shaft and having an outer peripheral surface which frictionally engages a cooperating surface in its associated driven member.

3. The invention as defined in claim 2 wherein the peripheral surface of the bushing is cylindrically circular in shape.

4. The invention as defined in claim 3 wherein said means for continuously driving said rollers between said work stations further comprises a plurality of intermediate shafts, each intermediate shaft extending axially throughout and secured to one intermediate roller, said intermediate shafts being rotatably mounted to said frame.

5. The invention as defined in claim 2 and further comprising a pair of bushings secured to each shaft at longitudinally spaced positions along the shaft.

6. The invention as defined in claim 5 wherein the bushings are positioned within cylindrical recesses formed on both axial ends of the roller.

* * * * *

UNITED STATES PATENT AND TRADEMARK OFFICE
CERTIFICATE OF CORRECTION

PATENT NO. : 4,331,228
DATED : May 25, 1982
INVENTOR(S) : Lawrence A. Galarowic

It is certified that error appears in the above—identified patent and that said Letters Patent is hereby corrected as shown below:

Column 3, line 48, delete "Thus", insert --The--

Signed and Sealed this

Tenth Day of August 1982

[SEAL]

Attest:

GERALD J. MOSSINGHOFF

*Attesting Officer*     *Commissioner of Patents and Trademarks*